(12) United States Patent
Watanabe et al.

(10) Patent No.: US 6,482,118 B1
(45) Date of Patent: Nov. 19, 2002

(54) POWER TRANSMISSION BELT AND METHOD FOR FABRICATING THE SAME

(75) Inventors: Koji Watanabe, Hyogo (JP);
Kazuyoshi Tani, Hyogo (JP);
Yoshitaka Kurose, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 09/572,305

(22) Filed: May 18, 2000

(30) Foreign Application Priority Data

May 24, 1999 (JP) .......... 11-143610
May 24, 1999 (JP) .......... 11-143618

(51) Int. Cl.[7] .............................. F16G 5/08
(52) U.S. Cl. ...................................... 474/263
(58) Field of Search ................... ; F16G 5/08

(56) References Cited

U.S. PATENT DOCUMENTS

| | | | | |
|---|---|---|---|---|
| 4,798,566 A | * | 1/1989 | Sedlacek | 474/238 |
| 5,197,928 A | * | 3/1993 | Mishima et al. | 474/263 |
| 5,413,538 A | * | 5/1995 | Mishima | 474/263 |
| 5,904,630 A | * | 5/1999 | Berthelier | 474/263 |

FOREIGN PATENT DOCUMENTS

| | | |
|---|---|---|
| JP | 3-219147 | 9/1991 |
| JP | 3-265741 | 11/1991 |
| JP | 7-4470 | 1/1995 |
| JP | 7-98044 | 4/1995 |
| JP | 7-151191 | 6/1995 |

* cited by examiner

*Primary Examiner*—Thomas R. Hannon
*Assistant Examiner*—Timothy McAnulty
(74) *Attorney, Agent, or Firm*—Nixon Peabody LLP; Thomas W. Cole

(57) ABSTRACT

Both types of short aramid fibers and non-aramid synthetic fibers are extruded from a side face of each rib in a V-ribbed belt. The extruded section of the short aramid fiber is formed in curled shape. The extruded section of the synthetic fiber is formed in a sector gradually broadened toward its distal end with its non-melting condition maintained. The root portions of the extruded sections of both types of short fibers are raised from the side face of the rib. The extruded sections of the short aramid fibers are extruded in multiple directions, whereas the extruded sections of the synthetic fibers are extruded in a given direction. The extruded section of the short aramid fiber is formed longer than the extruded section of the synthetic fibers.

10 Claims, 12 Drawing Sheets

POWER TRANSMISSION BELT AND METHOD FOR FABRICATING THE SAME

BACKGROUND OF THE INVENTION

This invention relates to a power transmission belt and method for fabricating the same, and particularly relates to a power transmission belt such as a V-ribbed belt or a V-belt in which short aramid fibers and non-aramid synthetic fibers are mixed into its compression rubber and a method for fabricating the same.

As disclosed in Japanese Patent Application Laid-Open Gazettes Nos. 3-219147 and 7-4470, there are conventionally known power transmission belts in which a crowd of short fibers are mixed into their compression rubber in a manner to be oriented along the width of the belt and some of the short fibers are extruded from the surface of the compression rubber. Power transmission belts of such kind aim at enhancing bearing strengths and wearing properties of their friction drive sections and preventing noise production during their running.

However, even such a power transmission belt out of which some of the short fibers extrude, if the total area of extruded sections of the short fibers occupying the surface of the compression rubber is small, cannot enhance its wearing property so much because the area of the compression rubber in direct contact with a pulley becomes correspondingly large.

For the purpose of increasing the exposure areas of short fibers with respect to the surface area of the compression rubber, Japanese Patent Application Laid-Open Gazette No. 1-164839 has proposed a power transmission belt as shown in FIG. 14. In this power transmission belt, extruded sections 102 of short aramid fibers 101 mixed into a compression rubber 100 are 0.065 to 0.13 mm long, longer than those of conventional short fibers, and are bent in a particular direction 103 along a working flank of the belt.

In such a power transmission belt, though the exposure areas of short fibers 101 can be increased, the extruded sections 102 are bent at their roots and therefore made substantially flush with the surface of the compression rubber 100. Accordingly, the extruded sections 102 are difficult to together form surface unevenness as considered as effectively suppressing noise. This invites a problem that the effect of suppressing noise cannot sufficiently be obtained.

Furthermore, since the extruded sections 102 of short fibers are bent in the particular direction 103 along the surface of the compression rubber 100, running the belt in a reverse direction would largely change properties of the belt. Therefore, in order for the belt to obtain its properties as designed, the belt must be checked carefully on its running direction at the time of fitting to pulleys. In addition, this conventional belt cannot sufficiently exhibit its performance when used with devices capable of conveniently switching the running directions of the belt.

Moreover, if the length for which the short fiber is extruded from the surface of the compression rubber 100 is too large, the belt will largely change its properties when the extruded sections 102 are reduced by abrasion. Therefore, considering to maintain desired belt properties constant for a long time, there is a limit to increasing the extruded length of the short fiber. Accordingly, it has been desired to make great strides in enhancing the performance of the belt by improving not only short fibers but also the compression rubber 100.

In view of these problems, an object of the present invention is to provide a power transmission belt excellent in wearing property, hard to produce noise and independent of its running direction.

Another object of the present invention is to further enhance the performance of the belt by improving the surface configuration of the compression rubber.

SUMMARY OF THE INVENTION

To attain the above first object, a power transmission belt of the present invention is constructed so that at least two types of crowds of short fibers, namely, a crowd of short aramid fibers and a crowd of non-aramid synthetic fibers, are mixed into a compression rubber and these crowds of short fibers are improved in configuration extruded out of the compression rubber.

More specifically, a power transmission belt of the present invention is directed to a power transmission belt in which a crowd of short aramid fibers and a crowd of non-aramid synthetic fibers are mixed into a compression rubber thereof in a manner to be oriented in a given direction and some of the short aramid fibers and some of the non-aramid synthetic fibers each have an extruded section extruded from a surface of the compression rubber, and is characterized in that the extruded sections of the non-aramid synthetic fibers are inclined in a given direction, the extruded sections of the short aramid fibers are inclined in multiple directions and the extruded section of the short aramid fiber is longer than the extruded section of the non-aramid synthetic fiber.

With this construction, since both the short aramid fibers and the non-aramid synthetic fibers are extruded from the surface of the compression rubber, the total exposure area of these two types of short fibers is large. Accordingly, the belt can enhance wearing property. Further, since some of the short aramid fibers are extruded in a manner to be inclined in multiple directions, the wearing property of the belt can be enhanced substantially uniformly in every direction. Therefore, the belt decreases the dependency on its running direction. Accordingly, the belt can enhance bearing strength and wearing property in either running direction. Furthermore, the short aramid fiber is more resistant to wear than the non-aramid synthetic fiber because of its relatively high strength. Therefore, even if the extruded section of the short aramid fiber is longer than that of the non-aramid synthetic fiber, the extruded section of the short aramid fiber is not rapidly reduced in length by abrasion. Accordingly, the belt does not change performance for a long time. Moreover, since the extruded sections of both the short aramid fiber and the non-aramid synthetic fiber are different in the lengths, microscopic unevenness is formed above the surface of the compression rubber. This microscopic unevenness can suppress the occurrence of noise.

The extruded sections of both the short aramid fibers and the non-aramid synthetic fibers are preferably raised from the surface of the compression rubber.

With this construction, the extruded sections of both the short aramid fibers and the non-aramid synthetic fibers have their root portions raised up from the surface of the compression rubber without falling to it. Accordingly, microscopic unevenness is formed over the surface of the compression rubber so that the root portion of each extruded short fiber constitutes a microscopic convexity and a surface region adjoining a place where each extruded short fiber is implanted constitutes a microscopic concavity, thereby suppressing the occurrence of noise.

The extruded section of the short aramid fiber is preferably bowed.

With this construction, the extruded sections of the short aramid fibers have sufficiently large exposure areas with respect to the surface area of the compression rubber, resulting in enhanced wearing property of the belt.

The extruded section of the short aramid fiber is preferably bowed first in one direction and then another direction on the way from root to tip thereof.

With this construction, since the extruded sections of the short aramid fibers are formed in curled shape, they exert restoring forces like leaf springs on a pulley. As a result, the extruded sections of the short aramid fibers can absorb variations in belt tension associated with the running of the belt. Also, stresses placed on the root portions of the extruded short aramid fibers can be relaxed by the restoring forces of the extruded sections of the short aramid fibers. Accordingly, the short aramid fibers can be prevented from dropping out of the compression rubber.

The extruded sections of the non-aramid synthetic fibers are preferably plastically deformed into flat shape.

With this construction, since the extruded sections of the non-aramid synthetic fibers are plastically deformed, they are not melted and can maintain their strengths intrinsic in synthetic fibers. Further, since the extruded sections of the non-aramid synthetic fibers are formed into flat shape, the surface area of each extruded fiber can be increased thereby further enhancing the wearing property of the belt.

The extruded section of the non-aramid synthetic fiber is preferably formed in a sector gradually broadened toward a distal end thereof.

With this construction, the extruded section of the non-aramid synthetic fiber can obtain a specific flat configuration of large exposure area.

If the extruded sections of short fibers are shortened by abrasion, the belt will change its properties. Therefore, excessively long extruded sections of short fibers could increase changes of the belt properties with time and make the belt difficult to exhibit constant performance for a long time. Accordingly, the extruded section of the short aramid fiber is preferably 50 $\mu$m or smaller in length and the extruded section of then on-aramid synthetic fiber is preferably 30 $\mu$m or smaller in length.

With this construction, the extruded section of each short fiber can obtain a suitable configuration of small change with time.

To attain the above second object, a power transmission belt of the present invention is so constructed that unevenness is provided in the surface of the compression rubber to increase its entire surface area.

Specifically, in the power transmission belt, the surface of the compression rubber is preferably formed in uneven configuration.

With this construction, since the surface of the compression rubber is formed unevenly, its entire surface area can be increased. This enhances the performance of the belt. In addition, clearances are likely to be formed between contact surfaces of the belt and a pulley. Accordingly, even if water or the like enters between the belt and pulley, it can be distributed or discharged through the clearances, which stabilizes frictional resistance of the belt.

The surface unevenness of the compression rubber is preferably formed in wavy shape. Thereby, a suitable uneven configuration can be formed in the surface of the compression rubber.

The surface unevenness of the compression rubber is preferably formed to have a level difference of 0.5 to 10 $\mu$m.

Also in this case, a suitable uneven configuration can be formed in the surface of the compression rubber.

A method for fabricating a power transmission belt of the present invention is directed to a method for fabricating a power transmission belt in which some of a crowd of short aramid fibers and some of a crowd of non-aramid synthetic fibers are extruded from a surface of a compression rubber, and is characterized by comprising the step of grinding the compression rubber into which the crowd of short aramid fibers and the crowd of non-aramid synthetic fibers are mixed in a manner to be oriented in a given direction with a grinding wheel having super abrasives extruded for 50 to 95% in grain size thereof from the surface of the grinding wheel.

According to this method, since the height of extrusion of each of the super abrasives is large, the short aramid fibers and the non-aramid synthetic fibers can be easily extruded from the surface of the compression rubber. Further, since the short aramid fiber has greater strength and elasticity over the non-aramid synthetic fiber, the extruded sections of the non-aramid synthetic fibers are extruded in a manner to be inclined in a single direction, whereas the extruded sections of the short aramid fibers are extruded at greater lengths in a manner to be inclined in multiple directions. In addition, such a large height of extrusion of the super abrasive can facilitate to form the surface of the compression rubber into uneven configuration.

Another method for fabricating a power transmission belt of the present invention is also directed to a method for fabricating a power transmission belt in which some of a crowd of short aramid fibers and some of a crowd of non-aramid synthetic fibers are extruded from a surface of a compression rubber, and is characterized by comprising the step of grinding the compression rubber into which the crowd of short aramid fibers and the crowd of non-aramid synthetic fibers are mixed in a manner to be oriented in a given direction with a grinding wheel having super abrasives the density of which is 3.5 to 55%.

According to this method, since the density of the super abrasives is relatively low, the short aramid fibers and the non-aramid synthetic fibers can be easily extruded from the surface of the compression rubber. Further, since the short aramid fiber has greater strength and elasticity over the non-aramid synthetic fiber, the extruded sections of the non-aramid synthetic fibers are inclined in a single direction, whereas the extruded sections of the short aramid fibers are inclined in multiple directions and extruded at greater lengths. In addition, such a small density of the super abrasives can facilitate to form the surface of the compression rubber into uneven configuration.

Still another method for fabricating a power transmission belt of the present invention is also directed to a method for fabricating a power transmission belt in which some of a crowd of short aramid fibers and some of a crowd of non-aramid synthetic fibers are extruded from a surface of a compression rubber, and is characterized by comprising the step of grinding the compression rubber into which the crowd of short aramid fibers and the crowd of non-aramid synthetic fibers are mixed in a manner to be oriented in a given direction with a grinding wheel having super abrasives which are each extruded for 50 to 95% of grain size thereof from the surface of the grinding wheel and the density of which is 3.5 to 55%.

According to this method, since the height of extrusion of each of the super abrasives is large and the density thereof is relatively low, the short aramid fibers and the non-aramid synthetic fibers can be extruded with great ease from the surface of the compression rubber. Further, since the short aramid fiber has greater strength and elasticity over the non-aramid synthetic fiber, the extruded sections of the non-aramid synthetic fibers are inclined in a single direction, whereas the extruded sections of the short aramid fibers are inclined in multiple directions and extruded at greater lengths. In addition, the surface of the compression rubber can be very easily formed into uneven configuration.

DESCRIPTION OF THE PREFERRED EMBODIMENTS

Hereinafter, embodiments of the present invention will be described with reference to the drawings.
Embodiment 1

Figure 1:
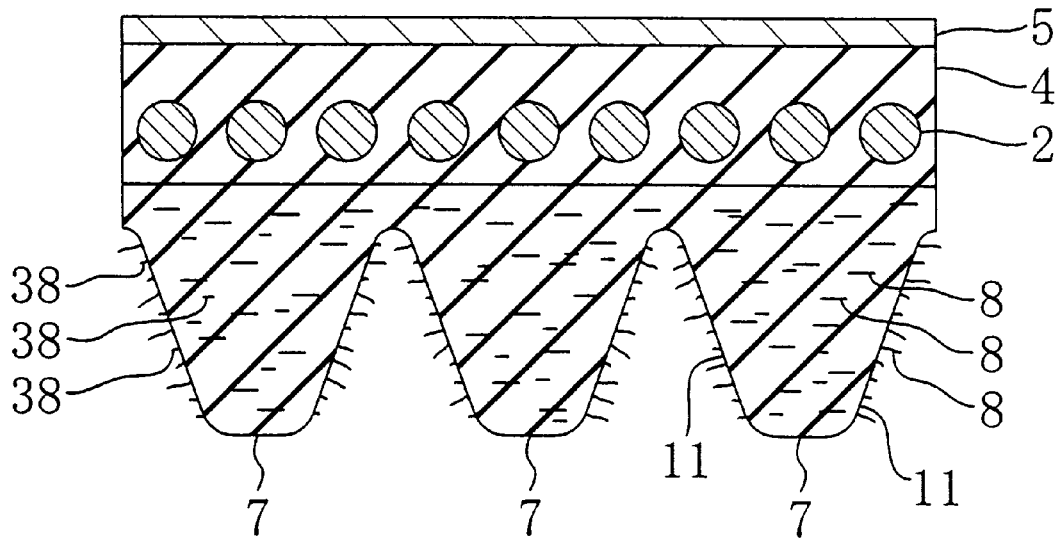
FIG. 1 is a cross-sectional view of a V-ribbed belt.

FIG. 1 shows a cross section of a power transmission belt 10 according to Embodiment 1 of the present invention. The power transmission belt 10 is a V-ribbed belt used for automotive engine auxiliary driving devices or other general industrial applications.

A tension member 2 extending along the length of the belt 10 is embedded in an adhesion rubber layer 4 in a manner to be arranged at regular intervals along the width of the belt 10 (in the lateral direction of FIG. 1). A fabric layer 5 is provided on the upper face side of the adhesion rubber layer 4, i.e., on the back face side of the belt 10. A plurality of ribs 7,7, . . . are provided along the width of the belt 10 on the lower face side of the adhesion rubber 4, i.e., on the bottom face side of the belt 10, to extend along the length of the belt 10. The plurality of ribs 7,7, . . . correspond to a "compression rubber" to which reference has been made in this description. The adhesion rubber layer 4 and the ribs 7 may be made of, for example, chloroprene rubber, H-NBR rubber, CSM rubber, natural rubber, SBR rubber, butadiene rubber, EPM or EPDM.

A plurality of short aramid fibers 8, 8, . . . and a plurality of non-aramid synthetic fibers 38, 38, . . . are embedded in each of the ribs 7, 7, . . . while maintaining their orientation to a given direction. Particularly in this invention, the short aramid fibers 8, 8, . . . and synthetic fibers 38, 38, . . . are embedded in each of the ribs 7, 7, . . . while maintaining their orientation to the belt widthwise direction.

The short aramid fiber 8 may be made of a para-aramid or meta-aramid fiber. In other words, poly-para-phenyleneterephthalamide or poly-meta-phenyleneisophthalamide is applicable for the short aramid fiber 8. More specifically, Kevlar (trademark of E. I. Du Pont de Nemours & Co.), Technora (trademark of Teijin Ltd.), Twaron (trademark of Enka B. V.) or the like may be used as a para-aramid fiber. Conex (trademark of Teijin Ltd.), Nomex (trademark of E. I. Du Pont de Nemours & Co.) or the like may be used as a meta-aramid fiber. A blended yarn of a short aramid fiber and a natural fiber is applicable instead of the short aramid fiber 8. For the synthetic fiber 38, suitable use can be made of nylon, vinylon, polyester or the like with a filament diameter of 20 $\mu$m or more.

Figure 2:
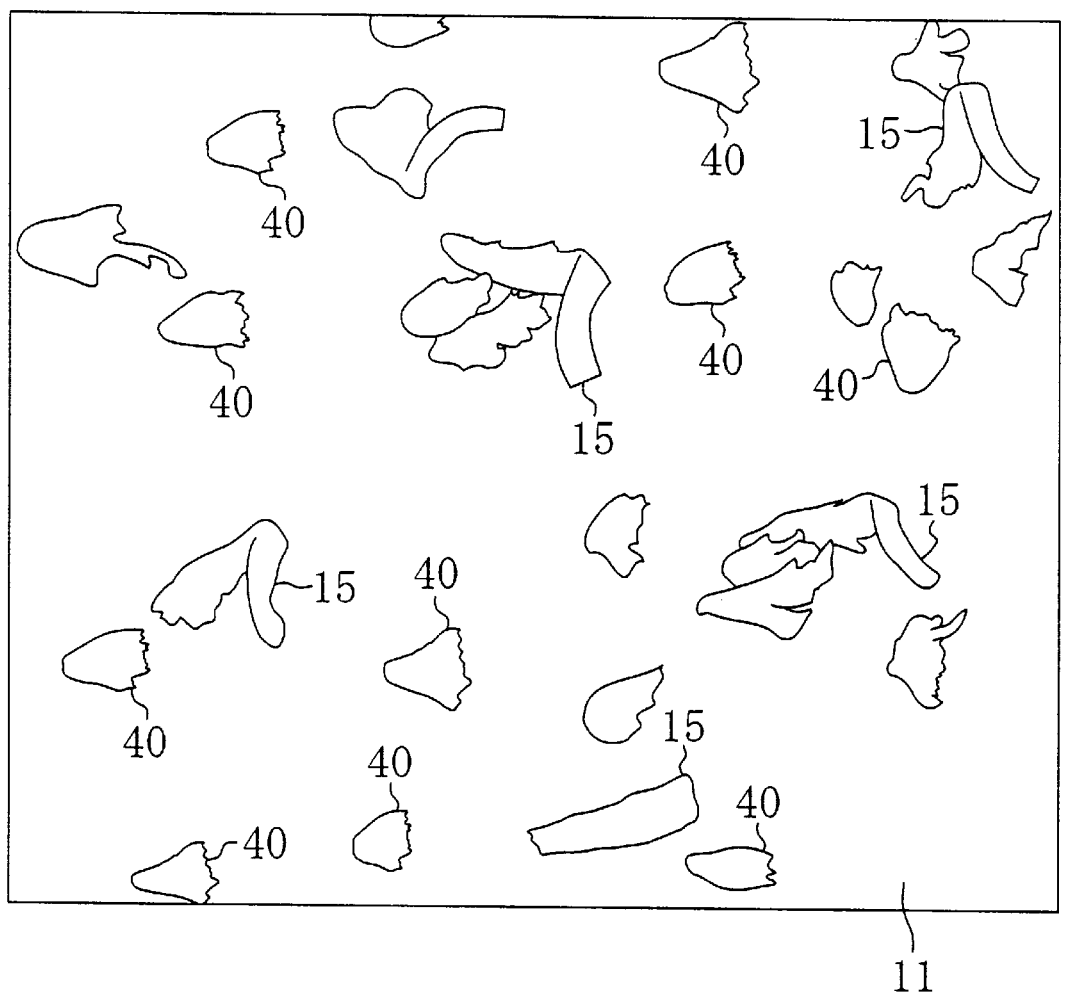
FIG. 2 is an enlarged view showing the surface of a rib of a V-ribbed belt according to Embodiment 1 of the present invention.
Figure 3:
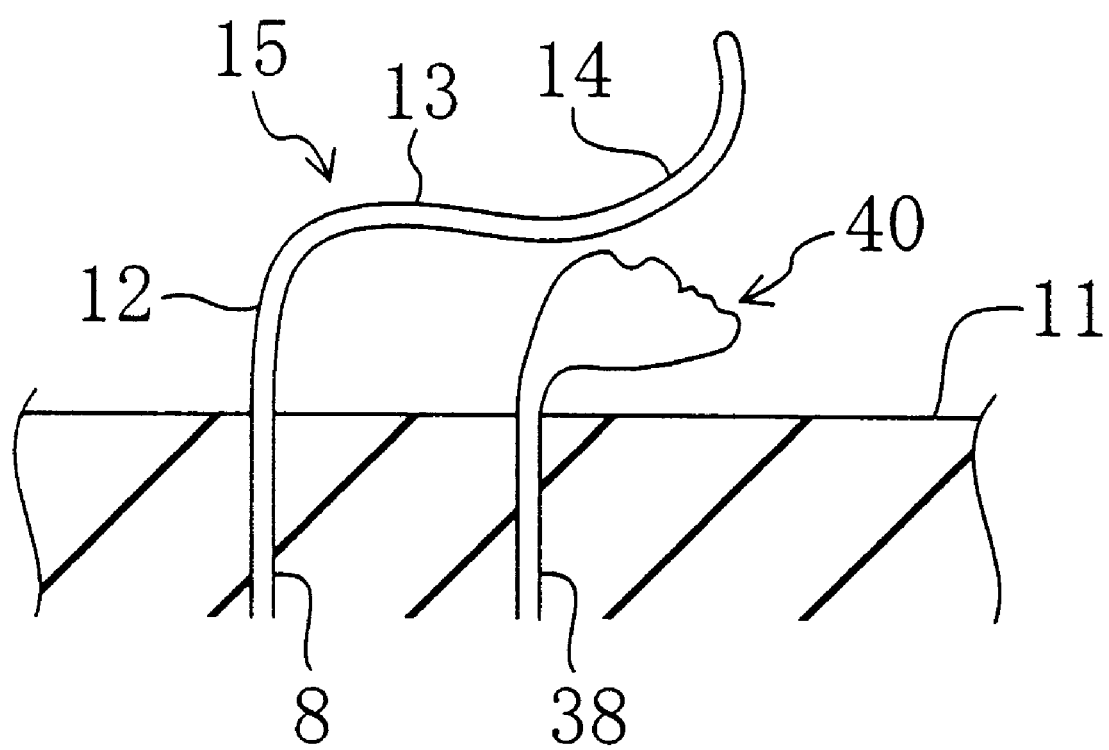
FIG. 3 is an enlarged cross-sectional view showing the vicinity of the surface of the rib in the V-ribbed belt according to Embodiment 1 of the present invention.

As shown in FIGS. 2 and 3, some of the short aramid fibers 8, 8, . . . embedded in each of the ribs 7 are extruded from the side face 11 of the rib 7. Extruded sections 15, 15, . . . of the short aramid fibers 8, 8, . . . are bowed to increase their exposure areas. Further, the extruded sections 15, 15, . . . of the short aramid fibers 8, 8, . . . are bowed not in a single direction but irregularly in multiple different directions. Thus, since the plurality of extruded fiber sections 15, 15, . . . are bowed in various directions to decentralized their orientation, the wearing property of the V-ribbed belt 10 is enhanced uniformly in every direction. The V-ribbed belt 10 thereby decreases the dependency on its running direction.

As shown in FIG. 3, the root portion 12 of the extruded section 15 of the short aramid fiber 8 is raised from the side face 11 of the rib 7. In other words, the root portion 12 of the extruded fiber section 15 is in substantially upright position with respect to the side face 11 of the rib 7. The medial portion 13 of the extruded fiber section 15 is bowed from the end of the root portion 12. The tip portion 14 of the extruded fiber section 15 is bowed in a direction different from the bowing direction of the medial portion 13. For example, in the short aramid fiber 8 shown in FIG. 3, the tip portion 14 is bowed in a direction opposite to the bowing direction of the medial portion 13. Namely, the extruded short aramid fiber 8 is formed in such a curled shape as bowed first in a certain direction and then opposite direction on its way from root to tip. As a result, the extruded section 15 of the short aramid fiber 8 is kept elevated above the side face 11 of the rib 7. Accordingly, the short aramid fiber 8 can exert arestoring force like a leaf spring in association with its curled shape. In addition, the extruded sections 15 of the short aramid fibers 8 form, over the side face of the rib 7, microscopic unevenness such that the extruded sections 15 constitute microscopic convexities and surface regions of the rib 7 adjoining places where the extruded short aramid fibers 8 are im planted in the rib 7 constitute microscopic concavities. By friction with a grinding wheel during a grinding process described later, some of the extruded sections 15, 15, . . . of the short aramid fibers 8, 8, . . . are flattened and others are cracked at the tips thereof.

Some of the synthetic fibers 38, 38, . . . embedded in each of the ribs 7 are also extruded from the side face 11 of the rib 7. The extruded section 40 of the synthetic fiber 38 is formed in a sector gradually flattened and broadened toward its distal end. The corners of the sector are rounded to present gently curved surfaces. Also, the extruded section 40 of the Synthetic fiber 38 is kept in non-melting condition and formed at its distal end in the shape of waves. As shown in FIG. 3, the root portion of the extruded section 40 of the synthetic fiber 38 is likewise raised from the side face 11 of the rib 7. However, extruded sections 40, 40, . . . of the synthetic fibers 38, 38, . . . are inclined in a given direction unlike the extruded sections 15, 15, . . . of the short aramid fibers 8, 8, . . .

The extruded section 15 of the short aramid fiber 8 is longer than the extruded section 40 of the synthetic fiber 38. The length of the extruded section 15 of the short aramid fiber 8 is 50 μm or smaller. The length of the extruded section 40 of the synthetic fiber 38 is 30 μm or smaller.

Embodiment 2

Figure 4:
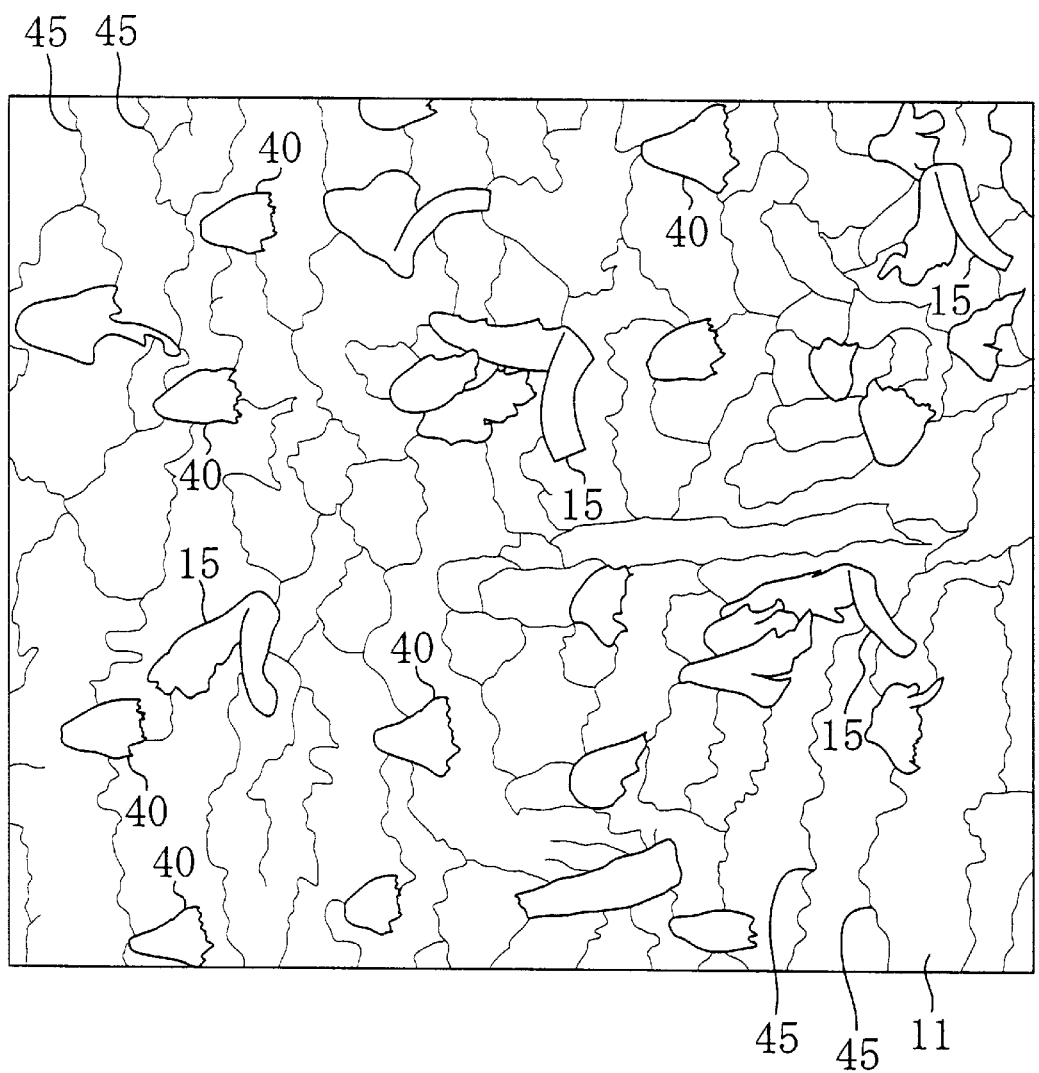
FIG. 4 is an enlarged view showing the surface of a rib of a V-ribbed belt according to Embodiment 2 of the present invention.
Figure 5:
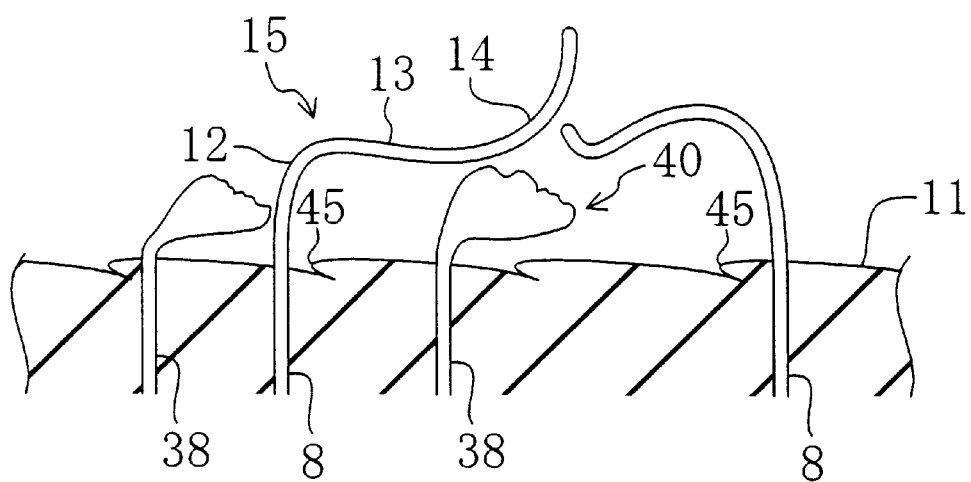
FIG. 5 is an enlarged cross-sectional view showing the vicinity of the surface of the rib in the V-ribbed belt according to Embodiment 2 of the present invention.
Figure 6:
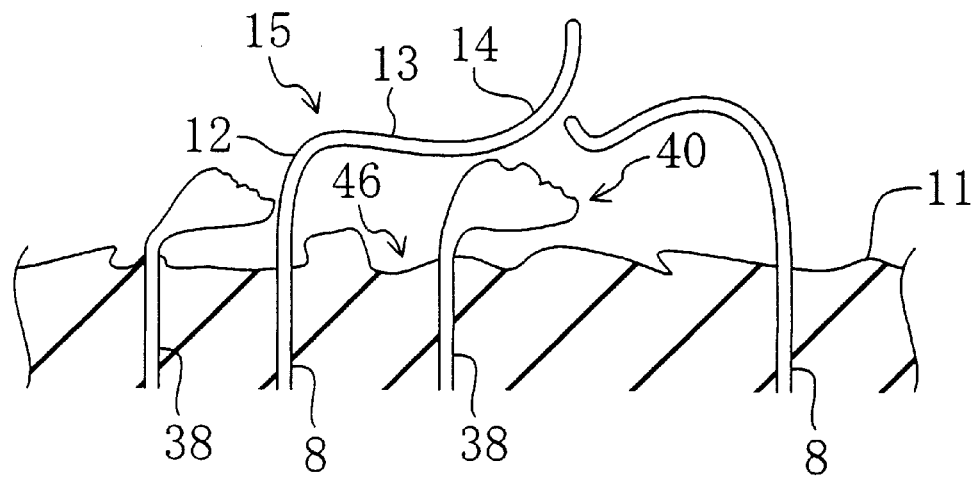
FIG. 6 is an enlarged cross-sectional view showing the vicinity of the surface of a rib in another V-ribbed belt according to Embodiment 2 of the present invention.

In a power transmission belt of Embodiment 2, as shown in FIGS. 4 and 5, microscopic unevenness (for example, with a level difference of 0.5 to 10 μm) is formed in a surface 11 of each rib 7. In this embodiment, the surface unevenness of the rib is formed in such a configuration that a plurality of waves are traveled in a single direction by a wind, i.e., in wavy shape. However, it goes without saying that the surface unevenness of the rib in the present invention is not limited to such wavy shape but may be an uneven configuration 46 in which peaks and valleys are alternately disposed as shown in FIG. 6 or other uneven configurations.

Like Embodiment 1, extruded sections 15, 15, . . . of short aramid fibers 8, 8, . . . are raised from the side face 11 of the rib 7. Also, the root portions of extruded sections 40, 40, . . . of synthetic fibers 38, 38, . . . are likewise raised from the side face 11 of the rib 7. As a result, microscopic unevenness can be also formed over the surface of the rib 7 in such a manner that the extruded sections 15, 40 of the short aramid fibers 8 and synthetic fibers 38 constitute microscopic convexities and surface regions of the rib 7 adjoining places where the extruded short fibers 8, 38 are implanted constitute microscopic concavities, separately from the microscopic unevenness formed in the side face 11 of the rib 7.

Like Embodiment 1, the extruded sections 15, 15, . . . of the short aramid fibers 8, 8, . . . are bowed irregularly in multiple directions so as to differ their bowing directions from one another. The extruded section 40 of each synthetic fiber 38 is inclined in a direction opposed to wave fronts 45 in the wavy-shaped side face 11 of each rib 7.

Fabricating Method of V-ribbed Belt

A method for fabricating the V-ribbed belt 10 will be described next.

First, an unvulcanized rubber sheet for constituting the adhesion rubber layer 4, a cord for constituting the tension member 2 and another unvulcanized rubber sheet into which short aramid fibers and non-aramid synthetic fibers are mixed are stacked in this order, and these elements are hot cured thereby obtaining a molded form of belt in cylindrical shape.

Figure 7:
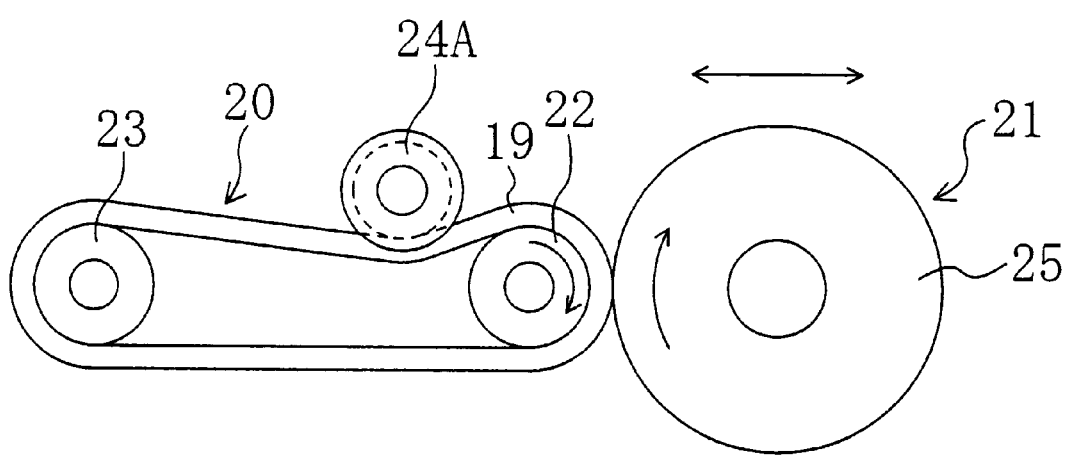
FIG. 7 is a schematic view showing the structure of a grinding apparatus for a V-ribbed belt.

Then, as shown in FIG. 7, the molded form of belt 19 is entrained around main and tension rolls 22, 23 of a drive mechanism 20 and is run by this drive mechanism 20. In the figure, the reference numeral 24A denotes a guide roll. Next, the running molded form of belt 19 is pressed against a grinding wheel 21 driven into rotation thereby grinding the molded form of belt 19. In this case, the short aramid fibers 8 are hardly cut off because of its large greige tensile modulus and some of them are extruded for relatively large lengths from the side faces 11 of the ribs 7. Also, some of the synthetic fibers 38 are extruded in positions inclined reversely to the belt running direction. Through this grinding process, each of the extruded short aramid fibers 8 and synthetic fibers 38 is released from stress induced in its surface by interference with abrasives thereby plastically deforming.

During this grinding process, the short aramid fiber 8 and synthetic fiber 38 can be adjusted in their extruded configuration and so on by controlling the type or pressing force of the grinding wheel 21.

Figure 8A:
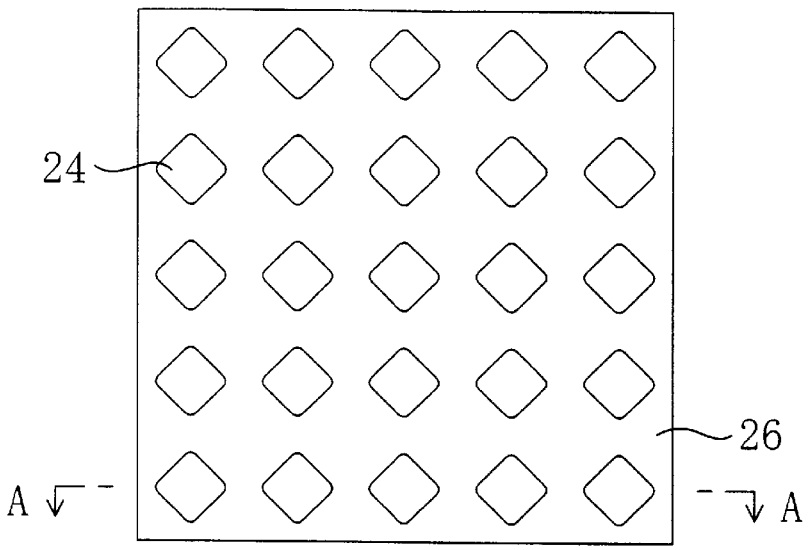
FIG. 8(a) is a partly enlarged plan view showing the periphery of a grinding wheel and FIG. 8(b) is a cross-sectional view taken along the line A—A of FIG. 8(a).
Figure 8B:
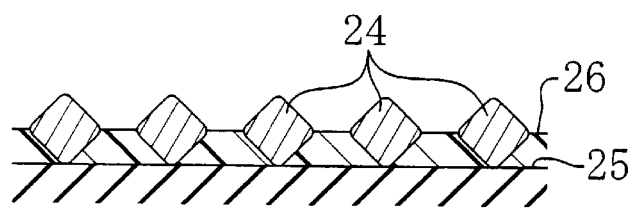

For the grinding wheel 21, use is preferably made of a construction in which diamond abrasives 24 are fixed on the periphery of a disk-like wheel 25 by electroplating, brazing, baking or the like. However, abrasives in the present invention is not limited to diamond abrasives but may be other super abrasives made of, for example, cubic boron nitride (CBN). FIG. 8(*a*) is a partly vertical projection of the periphery of the wheel 25, and FIG. 8(*b*) is a cross-sectional view taken along the line A—A of FIG. 8(*a*). As shown in these FIGS. 8(*a*) and 8(*b*), bond (such as metal bond or nickel bond) is spread and coated in a thin layer on the periphery of the wheel 25 (see FIG. 7) to form a bonding part 26.

The diamond abrasives 24 are distributed uniformly in and adhered to the bonding part 26. The grain size of the abrasive 24 is set preferably in the range of #30 to #200, and at #140 in this embodiment. The height of extrusion of each abrasive 24 is set preferably at 50 to 95% of its entire height, and at 80% thereof in this embodiment. The density of the abrasives 24 (the rate at which the total surface area of the abrasives occupies with respect to the entire grinding surface area) is set preferably in the range of 3.5 to 55%, and at 45% in this embodiment.

The rotation of the wheel 25 in the grinding process is made preferably at a peripheral speed of between 500 and 2000 m/min, and at a peripheral speed of 1000 m/min in this embodiment. The grinding speed ratio Vs/Vw, which is a ratio of the peripheral speed Vs of the grinding wheel 21 to the peripheral speed Vw of the belt 19, is set preferably in the range of 0.002 to 0.04, and at 0.004 in this embodiment.

Effects of this Embodiment

As can be seen from the above, since the extruded sections 15 of the short aramid fibers 8 in the V-ribbed belt 10 are bowed, the total surface area of the extruded short aramid fibers 8 is large with respect to the area of the side face 11 of the rib 7. This enhances the wearing property of the V-ribbed belt 10.

Further, since some of the extruded short aramid fibers 8 are flattened or cracked at their tips, they further increase their surface areas. This further enhances the wearing property of the V-ribbed belt 10. If a short fiber is fibrillated at its end, its intrinsic strength maybe impaired. The short fibers in this embodiment, however, are cracked without fibrillation. That is, the crack of the short aramid fiber 8 in this inventive belt 10 is a line of the short fiber broken at a more macroscopic level than fibrillated. Accordingly, the short aramid fibers 8 are not impaired in their intrinsic strengths.

Since the extruded sections 15, 15, . . . of the short aramid fibers 8, 8, . . . are bowed in multiple directions, their performance can be exhibited independent of the running direction of the belt 10. Therefore, when the belt 10 grips or travels away from a pulley, stable frictional resistance can be established in friction surfaces of the belt 10 and the pulley. As a result, variations in frictional resistance can be reduced thereby stabilizing the running of the belt 10.

Since the medial and tip portions 13, 14 of the extruded section 15 of the short aramid fiber 8 are bowed in different directions, the extruded section 15 of the short aramid fiber 8 has a restoring force like a leaf spring. As a result, the restoring forces of the short aramid fibers 8 can absorb variations in pressure applied to the V-ribbed belt 10. Accordingly, the running of the belt 10 is further stabilized so that the belt 10 can transmit power with increased stability. In addition, the restoring forces can relax the stresses placed on the root portions 12 of the extruded short aramid fibers 8. Accordingly, the short aramid fibers 8 can be prevented from dropping out thereby suppressing deterioration of the V-ribbed belt 10.

Since the root portions 12 of the extruded short aramid fibers 8 are raised from the side face 11 of the rib 7, microscopic unevenness such that the root portions 12 constitute microscopic convexities is formed over the side face 11 of the rib 7. This enables to effectively prevent the occurrence of noise.

Since the extruded section 40 of the synthetic fiber 38 is formed into flat shape, the total surface area of the extruded synthetic fibers 38 is greater than that of extruded synthetic fibers formed into circular section with respect to the area of the side face 11 of the rib 7. In addition, since the extruded section 40 of the synthetic fiber 38 is formed at its distal end in the shape of waves, the total surface of the extruded synthetic fibers 38 is even greater. Accordingly, the V-ribbed belt 10 can be further enhanced in wearing property.

Since the extruded section 40 of the synthetic fiber 38 is formed in a rounded sector, the belt 10 can attain stable frictional resistance even if bearing stress on the side face 11 of the rib 7 is large or uneven.

Since the root portions of the extruded sections 40 of the synthetic fibers 38 are raised from the side face 11 of the rib 7, water or oil entering between frictional surfaces of the belt and a pulley can be readily discharged through clearances between the root portions of the extruded sections 40. Therefore, even if water or the like enters between the frictional surfaces of the belt and the pulley, the belt is stable in frictional resistance.

In the V-ribbed belt 10 of this embodiment, since both the short aramid fibers 8 and the synthetic fibers 38 are extruded from the side face 11 of each rib 7, the total exposure area of these short fibers can be increased without increasing the total amount of short fibers mixed into the ribs 7. Accordingly, the belt can enhance wearing property without impairing flexibility.

With the construction of Embodiment 2, since microscopic unevenness is formed in the side face 11 of each rib 7, the surface area of the rubber portion of the rib 7 is large. This enables to reduce bearing stress on the surface of the rubber portion. Accordingly, wear of the rubber portion can be suppressed, resulting in improved friction property and elongated life time of the belt.

If water or oil enters between a pulley and a belt, the belt generally becomes unstable in frictional resistance. In the V-ribbed belt 10 of Embodiment 2, however, microscopic unevenness is formed over the side face 11 of each rib 7. Accordingly, microscopic clearances are formed between the belt and a pulley. Therefore, water or the like is distributed among the clearances and then readily discharged through the clearances, which stabilizes frictional resistance of the belt.

Since the short aramid fibers 8 and synthetic fibers 38 are extruded from the side face 11 of each rib 7, the rib 7 itself is hardly worn and its surface is hardly flattened. Accordingly, the belt can exhibit for a long time the above effects obtained by forming the rib surface into uneven configuration.

Further, each rib 7 has unevenness in the side face 11 itself. Therefore, even if the rib 7 itself is worn due to extended periods of use, the belt can be expected to continue to exhibit the above effects unless the uneven surface has been worn out into a flat. Accordingly, the V-ribbed belt 10 in this embodiment can retain its high performance for a long time.

According to the method for fabricating a V-ribbed belt of this invention, since grinding the rib 7 is made using a grinding wheel with super abrasives each extruded for 50 to 95% of their grain size from the bonding part 26, a contact between the boding part 26 and the rib 7 is hard to occur during grinding. Therefore, an amount of heat produced by friction is small. This enables successful grinding and facilitates to plastically deform the extruded sections 40 of the synthetic fibers 38 for maintenance in non-melting condition.

Since the density of super abrasives 24 is relatively as low as 3.5 to 55%, clearances between the abrasives, i.e., chip pockets, are large in size. Therefore, clogging between the abrasives due to the chips is difficult to occur during grinding. Accordingly, heat production due to such clogging can be suppressed, which facilitates to maintain the extruded sections 40 of the synthetic fibers 38 in non-melting condition.

Furthermore, extrusion of both types of short fibers 8, 38 provides the following synergistic effects. Specifically, since the short aramid fiber 8 has a higher elasticity and a greater length of extrusion, the shearing force on each synthetic fiber 38 during grinding is smaller as compared with the case where only the synthetic fibers 38 are mixed into the rib 7. Therefore, the flatness and length of each extruded synthetic fiber 38 can be increased. In addition, frictional resistance between the belt and a pulley can be further decreased in a rib portion where the short aramid fiber 8 and the synthetic fiber 38 are overlapped.

Figure 9:
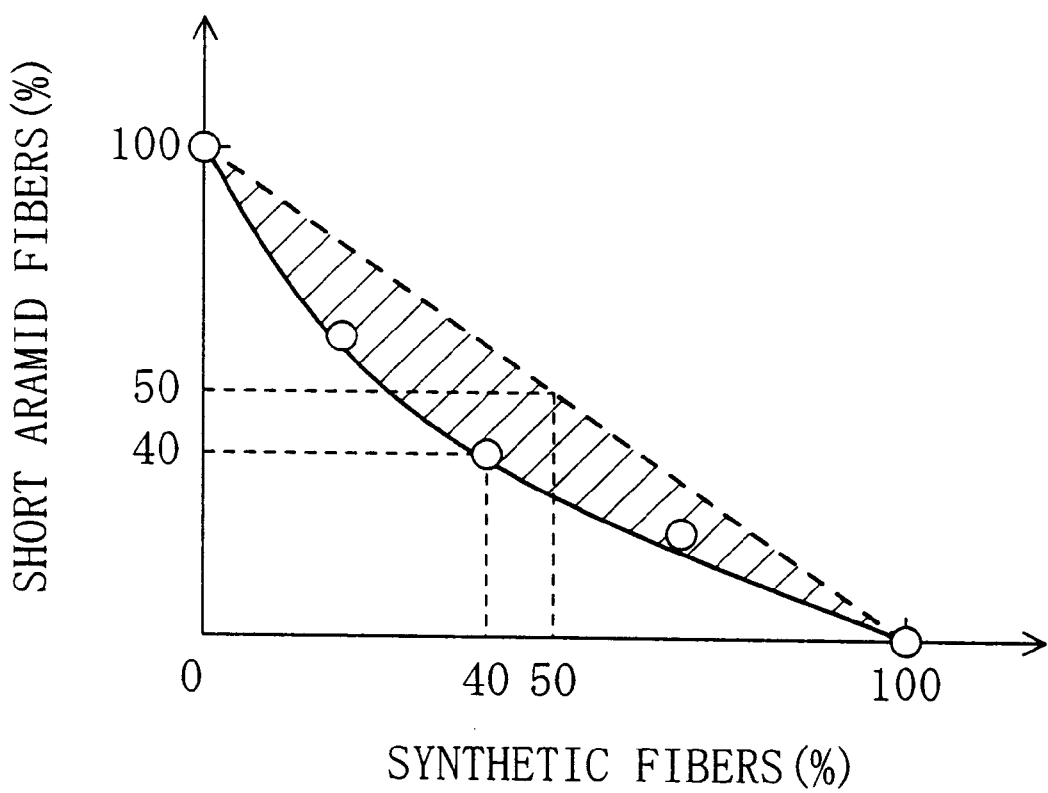
FIG. 9 is a graph for illustrating a synergistic effect of short aramid fibers and synthetic fibers.

FIG. 9 is a graph for illustrating an example of synergistic effects of both types of the short fibers 8, 38. In the graph, the broken line represents the case (virtual case) where both the effects of the short fibers 8, 38 of two types are simply summed, and the solid line represents the case where a synergistic effect of the short fibers 8, 38 of two types is taken in consideration. Considering the synergistic effect of both types of the short fibers 8 and 38, the graph shows that in order to attain the same performance as the rib 7 containing 50 wt % short aramid fibers 8 and 50 wt % synthetic fibers 38 in the virtual case, it suffices for the rib 7 to contain 40 wt % short aramid fibers 8 and 40 wt % synthetic fibers 38. In other words, both types of the short fibers 8, 38 can be decreased 10% by weight for each type. As can be understood, the portion of the graph indicated by single cross-hatching represents decreases in weight of both types of the short fibers 8 and 38. According to the V-ribbed belt 10 of the present invention, such a synergistic effect enables to decrease the respective weights of the short fibers 8, 38 and thereby enables to reduce the cost in correspondence with the decrease in those weights.

Performance Comparison

Figure 10:
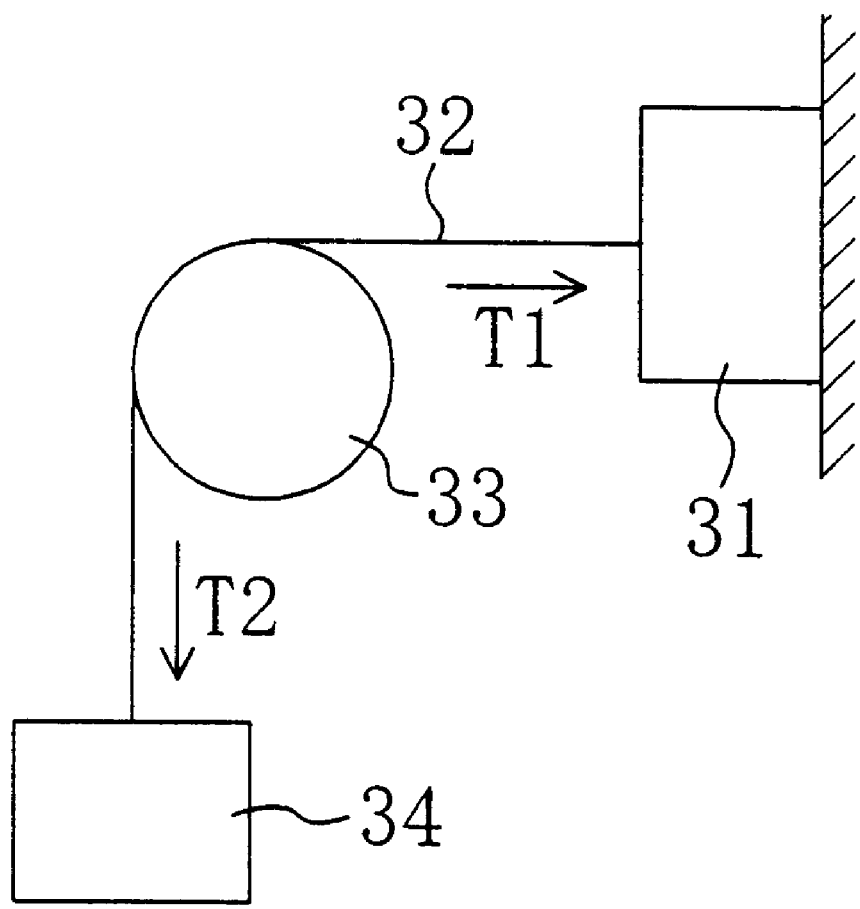
FIG. 10 is a schematic view showing the structure of a testing device for a performance comparison test.

Next, description will be made about a performance comparison test for comparing performances of the V-ribbed belt 10 in Embodiment 2 and a V-ribbed belt (comparative example) in which the side face 11 of each rib 7 is formed with no unevenness. In this test, a weight weighing W was suspended from a load cell 31 through a guide roller 33 by a sample belt 32 as shown in FIG. 10, respective tensions T1 and T2 at tight and slack sides of the belt 32 were measured by detecting a value of the load cell 31, and a frictional force of the belt 32 was determined from the ratio (tension ratio) T1/T2.

Figure 11:
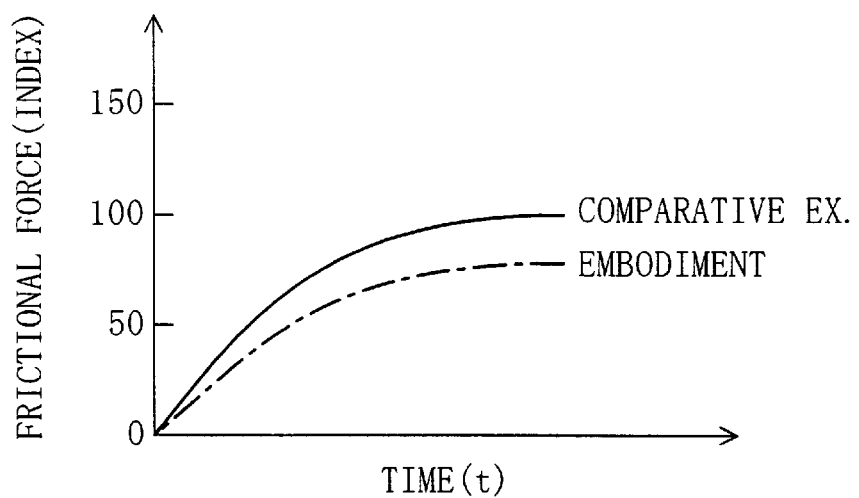
FIG. 11 is a graphic representation of performance comparison of inventive and comparative V-ribbed belts with reference to frictional forces.
Figure 12:
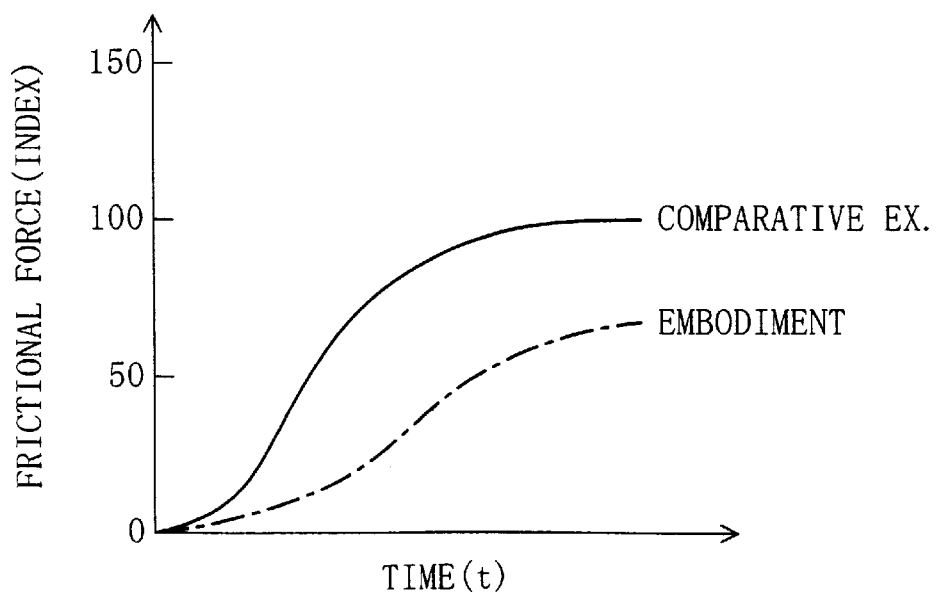
FIG. 12 is a graphic representation of performance comparison of the inventive and comparative V-ribbed belts with reference to frictional forces under water-in pouring conditions.

As shown in FIG. 11, the test results showed that the V-ribbed belt 10 in this embodiment was about 25% smaller in frictional force than the comparative example. Further, the same test was conducted under the conditions where water was in poured between the guide roller 33 and the sample belt 32. The test results showed that, as shown in FIG. 12, the V-ribbed belt 10 in this embodiment was about 30% smaller in frictional force than the comparative example.

Modifications

Figure 13:
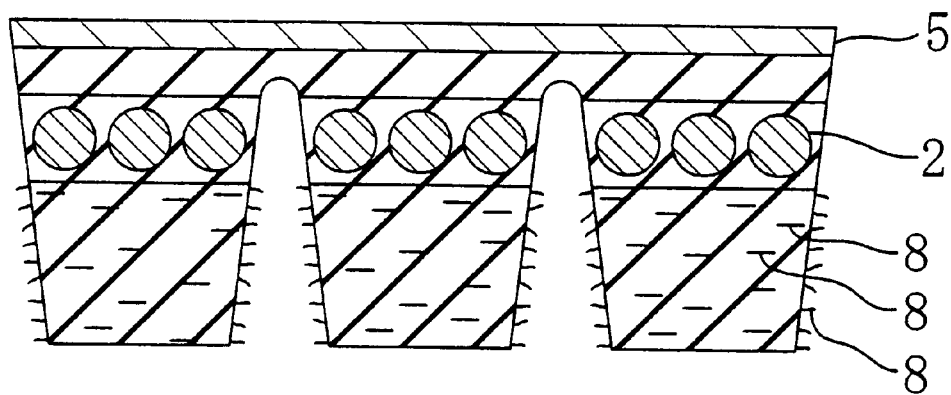
FIG. 13 is a cross-sectional view of a joined V-ribbed belt.
Figure 14:
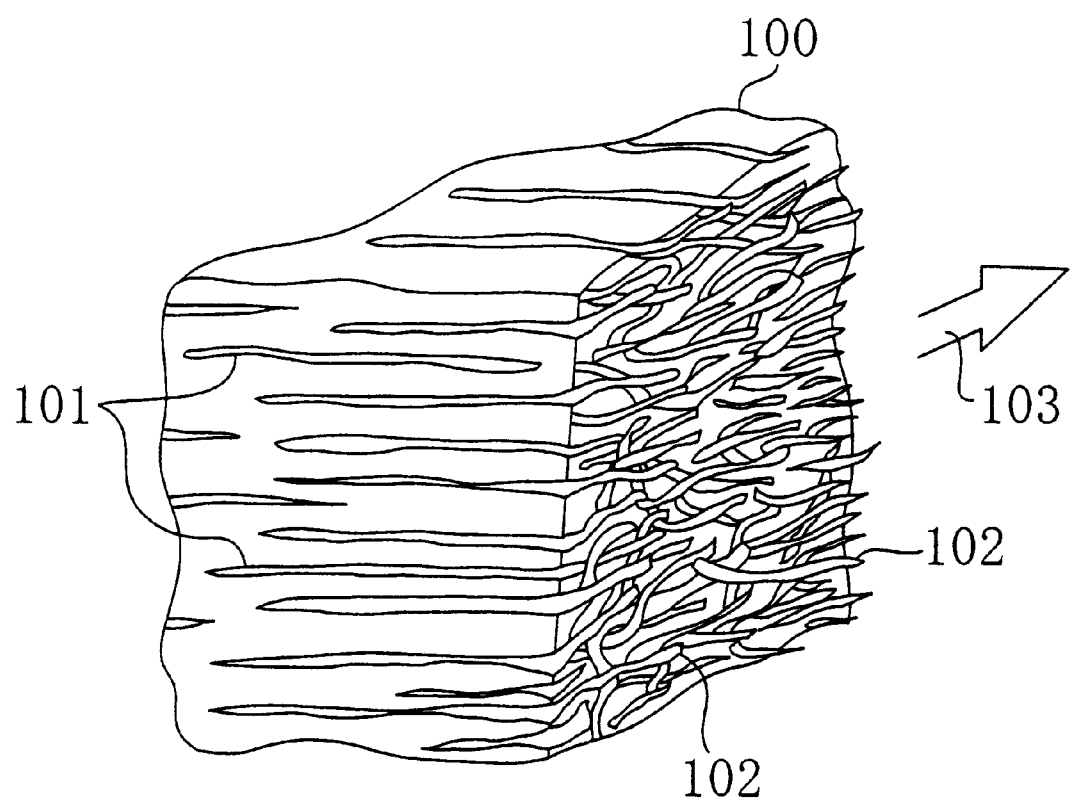
FIG. 14 is a view showing how a conventional power transmission belt has short aramid fibers extruded.

The present invention is not limited to the V-ribbed belts 10 as described in the above embodiments but may be V-ribbed belts of other types. For example, a joined V-ribbed belt lOA as shown in FIG. 13 is also applicable. Further, power transmission belts of other types such as V-belts are also applicable.

What is claimed is:

1. An elongated power transmission belt in which a plurality of short aramid fibers and a plurality of non-aramid synthetic fibers are mixed into a compression rubber thereof so as to be oriented in a given direction, some of the short aramid fibers and some of the non-aramid synthetic fibers each having a protruded section extending from a surface of the compression rubber, wherein protruded sections of the non-aramid synthetic fibers are bowed in a single direction with respect to a belt longitudinal axis, protruded sections of the short aramid fibers are bowed from a fiber root in multiple directions such that a portion of each of said protruded sections of the short aramid fibers is substantially parallel to said belt surface, and said substantially parallel portions point in multiple directions with respect to said belt axis, such that a substantial percentage of said parallel portions point in opposing directions with respect to said axis, and said protruded sections of said short aramid fibers are longer than said protruded sections of said non-aramid synthetic fibers.

2. The power transmission belt of claim 1, wherein the protruded sections of both the short aramid fibers and the non-aramid synthetic fibers are raised from the surface of the compression rubber.

3. The power transmission belt of claim 2, wherein the protruded section of each of said short aramid fibers is bowed first in one direction and then another direction on the way from a root to a tip thereof.

4. The power transmission belt of claim 2, such that a root portion of each protruded fiber forms a microscopic convexity and a surface region on the compression rubber where said protruded fibers are implanted forms a microscopic concavity whereby a noise-suppressing microscopic unevenness on said surface of said rubber is attained.

5. The power transmission belt of claim 1, wherein said protruded sections of the non-aramid synthetic fibers are each plastically deformed into a flat shape.

6. The power transmission belt of claim 5, wherein said protruded sections of said non-aramid synthetic fibers are each formed in a sector gradually broadened toward a distal end thereof.

7. The power transmission belt of any one of claims 1 through 6, wherein the protruded section of said short aramid fibers are each 50 μm or smaller in length, and the protruded section of said non-aramid synthetic fibers are each 30 μm or smaller in length.

8. The power transmission belt of any one of claims 1 through 6, wherein the surface of the compression rubber is formed in uneven configuration.

9. The power transmission belt of claim 8, wherein the surface unevenness of the compression rubber is formed in wavy shape.

10. The power transmission belt of claim 8, wherein the surface unevenness of the compression rubber is formed to have a level difference of 0.5 to 10 μm.

* * * * *